Feb. 22, 1955    C. E. LASHO, JR    2,702,891
ISOLATED TUBE SOCKET
Filed May 16, 1952

INVENTOR.
CLARENCE E. LASHO, JR.
BY Marvin Moody
ATTORNEY

United States Patent Office 2,702,891
Patented Feb. 22, 1955

2,702,891

ISOLATED TUBE SOCKET

Clarence E. Lasho, Jr., Marion, Iowa, assignor to Collins Radio Company, Cedar Rapids, Iowa, a corporation of Iowa Application May 16, 1952, Serial No. 288,348

3 Claims. (Cl. 339—93)

This invention relates in general to mounting means, and in particular to a vibration-free tube mounting.

Electron tubes are affected by vibrations such as occur in automobiles, airplanes or other moving bodies. These vibrations cause the tubes to generate spurious frequencies that interfere with the operation.

It is an object of this invention to provide an electron tube mounting means which substantially isolates the tube from mechanical vibrations.

Another object of this invention is to provide a tube mounting means wherein the tube is separated from the chassis by flexible material.

A feature of this invention is found in the provision for a sheet of flexible material which supports a tube socket. The tube is received in the socket and limiting means prevent the socket from moving beyond predetermined limits relative to the flexible sheet.

Further objects, features and advantages of this invention will become apparent from the following description and claims when read in view of the drawings, in which:

Figure 1:
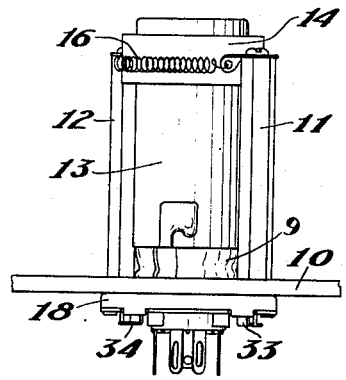
Figure 1 is a side view of the tube mounting of this invention.
Figure 2:
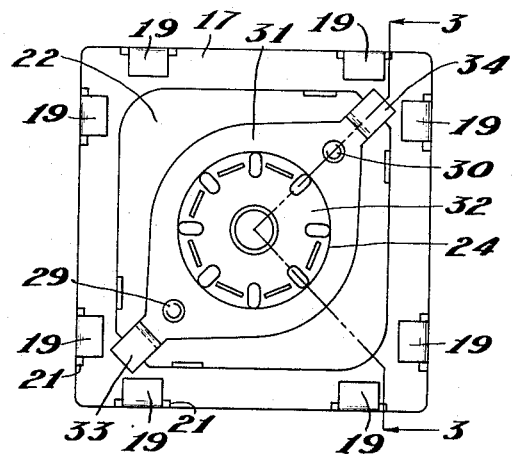
Figure 2 is a bottom view of the apparatus of this invention.
Figure 4:
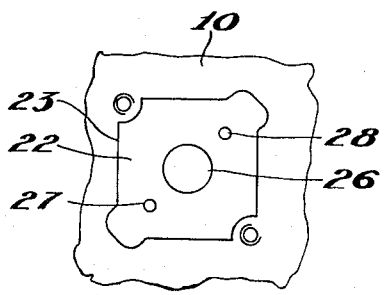
Figure 4 is a top view of the supporting plate with a flexible sheet mounted thereon.
Figure 3:
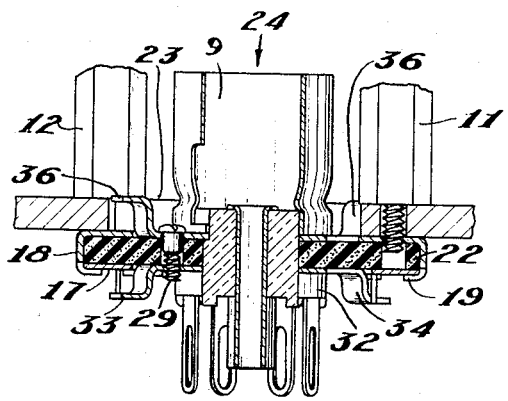
Figure 3 is a sectional view taken on line 3—3 of Figure 2.

Figure 1 illustrates a plate 10 which is a part of a chassis and which has mounted thereon a pair of stand-offs 11 and 12. An electron tube is mounted within a conventional shield 13 and has a sponge rubber ring 14 about its upper end.

A pair of springs 16 extend from the stand-offs 11 and 12 and clamp the sponge rubber so as to stabilize the top of the tube shield. Attached to the under side of the plate 10 is a hollow frame comprising a pair of rigid members 17 and 18. These members are joined together by tabs 19 which extend from the member 18 and are received in slots 21 formed in the member 17. Mounted between the members 17 and 18 is a sheet of flexible material 22, which might be, for example, white silicone rubber. The rubber is mounted so that it lays flat and does not have too much slack. It might have a thickness of three-thirty seconds of an inch.

An opening 23 is formed through the plate 10 in line with the flexible sheet 22. A standard tube socket 24 is received through an opening 26 formed in the silicone rubber sheet. Such tube sockets are well known to those skilled in the art and comprise an upper oval holding plate which has holes formed at either end. A shield locking means 9 also forms a part of the tube socket. In the illustrative embodiment, the shield locking means comprises an upstanding tubular portion secured at its base to the tube socket body as by crimping. The tubular shield may be fitted over the tubular portion and locked in place by the push-and-turn type of pin and slot connection.

The silicone rubber sheet 22 has holes 27 and 28 adjacent the opening 26 to allow bolts 29 and 30 to pass therethrough. A bottom plate 31 is generally oval in shape and has a center opening through which the bottom 32 of the tube shield may extend.

The member 31 is mounted relative to the members 17 and 18 so that it is on a diagonal. Extending from either end of the member 31 are downwardly curved tabs 33 and 34, respectively, which are engageable with the corners of the member 17 when the sheet 22 is pushed upwardly one tenth of an inch.

The upper oval portion of the tube socket is also formed with a pair of tabs 36 which are in alignment with the tabs 33 and 34. These tabs are bent upwardly and engage the member 18 when the tube socket is deflected downwardly approximately one tenth of an inch.

The screws 29 and 30 pass through the oval portion of the tube socket 24, the holes 27 and 28 of the rubber sheet 22, and are threadedly received in member 31. Tightening them forms a rigid assembly.

In operation, a tube is placed in the tube socket 24 and the shield 13 is mounted thereon. The springs 16 are connected between the stand-offs 11 and 12 to firmly hold the top of the tube shield from vibrating.

Since the tube socket 24 is supported only by the silicone rubber sheet 22, vibrations from the plate 10 will be substantially damped and will not be transmitted to the tube. The tabs 33, 34 and 36 provide limiting means, as for example when the tube is being pressed into the socket.

It is intended that the tube be completely isolated by flexible material all the time.

Silicone rubber has been used as an example of the material 22 because of its desirable characteristics under high and low temperatures and its resistance to deterioration and fatigue. It is to be realized, of course, that any other suitable material may be used.

Although this invention has been described with respect to a particular embodiment thereof, it is not to be so limited as changes and modifications may be made therein which are within the full intended scope of the invention, as defined by the appended claims.

I claim:

1. A flexible tube supporting means comprising, a chassis formed with an opening, holding means connected to said chassis about said opening, a flexible sheet received and held by said holding means over said opening, a tube socket extending through said flexible sheet, upper and lower plates engaging opposite surfaces of said flexible sheet and attached to said tube socket and to each other, said upper plate formed with a pair of upwardly extending tabs that are engageable with said holding means when the tube socket is depressed, said lower plate formed with a pair of downwardly extending tabs that are engageable with said holding means when said tube socket is deflected upwardly, a pair of stand-offs extending upwardly from said chassis, an electron tube received within said tube socket, a flexible ring extending around said electron tube, and holding means extending between said stand-offs and clamping said flexible ring therebetween.

2. Means for isolating an electron tube from vibrations comprising, a chassis with an opening formed therein, a pair of rigid plate members attached together and to said chassis and formed with an opening therethrough in alignment with the opening in said chassis, a flexible sheet member clamped between said rigid members and extending across said openings, a tube socket extending through an opening in the central portion of said flexible member, an upper plate attached to said tube socket on one side of said flexible member and in overlapping engagement with the peripheral edge of the opening therein and a lower plate attached to said tube socket on the opposite side of said flexible member and in overlapping engagement with the peripheral edge of the opening therein, said plates being formed with tabs extending outwardly in spaced overhanging relation with said rigid members to limit the deflection of said socket by engagement with said rigid members.

3. A flexible tube mounting means comprising, a chassis formed with an opening, holding means attached to said chassis about said opening, a flexible sheet held by said holding means over said opening, a tube socket extending through said flexible sheet, upper and lower plates connected to said tube socket and engaging opposite surfaces of said flexible sheet, upwardly extending tabs connected to said upper plate and engageable with said holding means when the tube socket is depressed, downwardly extending tabs connected to said lower plate and engageable with said holding means when said tube socket is deflected upwardly, a pair of stand-offs mounted adjacent said opening in said chassis, an electron tube received within said tube socket, a tube shield connected to said tube socket about said electron tube, a flexible ring of rubber-like material connected adjacent the top of said tube shield, and springs extending between the tops of said stand-offs and engageable with said flexible ring to support the upper portion of said electron tube in a vibration-free manner.

References Cited in the file of this patent

UNITED STATES PATENTS

| | | |
|---|---|---|
| 1,800,827 | Fuller | Apr. 14, 1931 |
| 1,817,355 | Elliott | Aug. 4, 1931 |
| 1,860,178 | Gunther | May 24, 1932 |
| 2,195,180 | Marzetti | Mar. 26, 1940 |
| 2,347,969 | Rubly | May 2, 1944 |
| 2,382,428 | Leuvelink | Aug. 14, 1945 |
| 2,505,163 | Wanner | Apr. 25, 1950 |

FOREIGN PATENTS

| | | |
|---|---|---|
| 356,509 | Great Britain | Sept. 10, 1931 |